United States Patent [19]

Burk

[11] Patent Number: 4,615,171
[45] Date of Patent: Oct. 7, 1986

[54] BICYCLE CHAIN LUBRICATION

[75] Inventor: Robert G. Burk, S. Hadley, Mass.

[73] Assignee: Incom International Inc., Pittsburgh, Pa.

[21] Appl. No.: 802,275

[22] Filed: Nov. 25, 1985

Related U.S. Application Data

[63] Continuation of Ser. No. 560,443, Dec. 12, 1983, abandoned.

[51] Int. Cl.$^4$ ............................................. F16G 13/06
[52] U.S. Cl. ...................................... 59/78; 59/4;
  59/8; 59/901; 474/206; 474/207; 474/231;
  29/149.5 PM; 384/280; 384/300
[58] Field of Search ........................ 59/5–8,
  59/4, 84, 78, 35.1, 901; 474/226–231, 206, 207,
  91; 29/149.5 PM, 149.5 NM; 384/279, 280, 300

[56] References Cited

U.S. PATENT DOCUMENTS

| | | | |
|---|---|---|---|
| 594,010 | 11/1897 | Harrington | 474/228 |
| 1,753,773 | 4/1930 | Champion | 29/149.5 R |
| 2,576,372 | 11/1951 | Toulmin | 59/78 |
| 2,798,005 | 7/1957 | Love | 384/300 |
| 2,816,453 | 12/1957 | Frank et al. | 59/4 |
| 2,995,462 | 8/1961 | Mitchell et al. | 384/300 |
| 3,153,348 | 10/1964 | Kuntzmann | 474/231 |
| 3,818,564 | 6/1974 | Tsuya et al. | 29/149.5 PM |
| 3,902,770 | 9/1975 | Hepp et al. | |
| 3,943,702 | 3/1976 | Lacombe-Allard | 59/4 |
| 4,308,153 | 12/1981 | Mori | |
| 4,484,988 | 11/1984 | Robinson | 204/35.1 |

FOREIGN PATENT DOCUMENTS

| | | | |
|---|---|---|---|
| 673452 | 11/1963 | Canada | 59/4 |
| 57939 | 4/1982 | Japan | 59/4 |
| 922307 | 3/1963 | United Kingdom | 59/78 |

Primary Examiner—Daniel C. Crane
Attorney, Agent, or Firm—James C. Wray

[57] ABSTRACT

Bicycle Chain is made of alternating bushing links and pin links. The bushing links have parallel bushings held in interference fit in bushing plates and extended axially beyond the bushing plates, solid metal rolls with a lubricating plating are held loosely on the bushings, and loosely between the bushing plates. The bushings extend axially outward beyond the bushing plates for substantial distances. Pins extend through the bushings and are fixed in pin plates to form pin links which alternate with the bushing links. The pin plates are held outward from the bushing plates for a substantial amount by the axial bushing extensions to prevent dirt build up. The pin plates, bushing plates and bushings are plated with an anti-corrosion plating. The pins and rolls are plated with a porous metal plating with solid polymeric lubricant held within pores of the plating for lubricating the pin-bushing interior interface and for lubricating the roll-bushing and roll-bushing plate interfaces.

13 Claims, 9 Drawing Figures

BICYCLE CHAIN LUBRICATION

This application is a continuation, of application Ser. No. 560,443, filed 12-12-83, now abandoned.

BACKGROUND OF THE INVENTION

Bicycle Chain, is subject to dirt build up because of its closeness to the ground when in use. Because of its position relative to the wheels, it is subjected to dirt and debris flying upward from the front tire and dirt and debris carried around by the back tire.

The susceptibility of chains to dirt build up and increased friction losses and malfunction caused by dirt build up is especially evident in bicycles used off roads and off paved tracks. Dirt build up induced power reduction and malfunction are especially serious in bicycles used on dirt and sand and particularly racing bicycles used on uneven dirt tracks.

When chains of conventional design are employed, dirt tends to accumulate on a chain and to slow or jam the chain. Dirt particularly accumulates in areas between adjacent pin plates and bushing plates, increasing frictional resistance to their normal pivoting or causing jamming and preventing their pivoting and preventing their fully or correctly engaging spocket teeth. That causes other increased friction loss and slowed bicycle operation or spocket jumping and stopping of a bicycle.

While many chains and many roll-type chains have been used, no chains with substantial spacing between bushing plates and pin plates have been considered as a means of preventing dirt build up in bicycle chain environments.

SUMMARY OF THE INVENTION

The present invention provides a dirt-free self-cleaning bicycle chain, in which dirt build up is reduced or prevented and in which adverse effects of dirt are reduced or prevented.

The present invention provides substantial axial spacing between bushing plates and adjacent portions of pin plates.

The dirt-avoiding and self-cleaning spacing is provided by axially extended bushings which extend outward beyond the bushing plates for substantial distance. Ends of the bushings hold the pin links outward. Pin plates are assembled close to the ends of the bushings and preferably as close as possible without any tight joints. Rolls are placed on the bushings between the bushing plates with sufficient internal clearance for permitting free rolling.

In preferred embodiments, the pin plates, bushing plates and bushings are plated with an FPC alloy. Pins and rolls are plated with a porous metal coating containing a solid polymeric lubricant in the pores. One suitable plating for the pins and rolls is described as a Polyon plating.

In the preferred embodiment the entire chain is lubricated with an FPS composition.

Liquid lubricating oils and greases are not preferred, since they tend to attract and hold dirt.

DETAILED DESCRIPTION OF THE DRAWINGS

Figure 1:
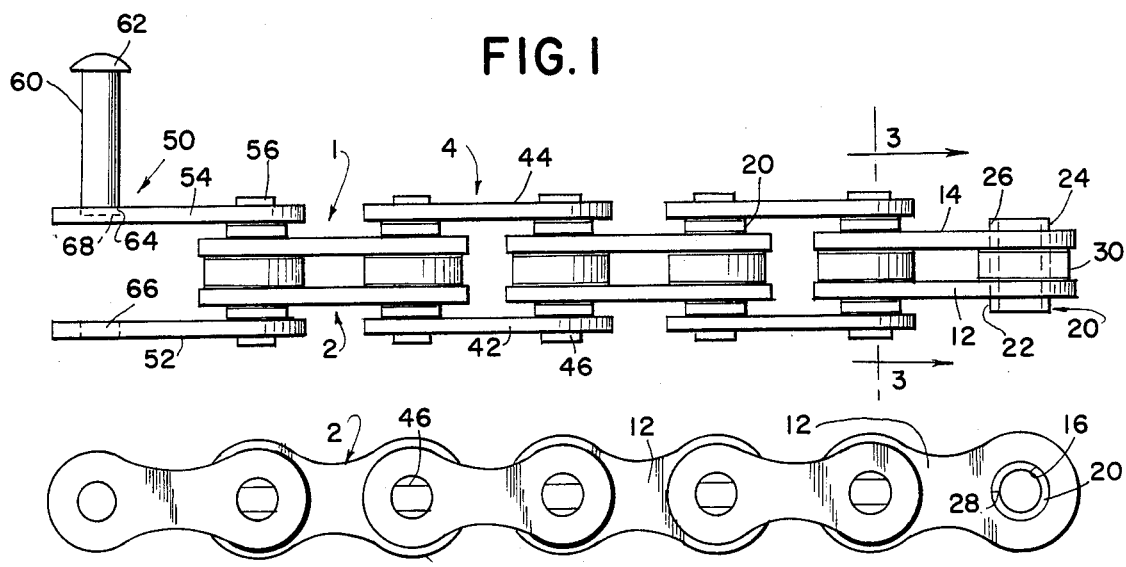
FIG. 1 of the drawings is a plan view of the preferred embodiment of the chain of the present invention.

As shown in FIG. 1 a bicycle chain is generally indicated by the numeral 1. Chain 1 is made up of bushing links generally indicated by the numeral 2, and pin links generally indicated by the numeral 4.

Each bushing link 2 has parallel spaced bushing plates 12 and 14 which have openings 16 in opposite ends thereof for receiving bushings 20. Bushings 20 have opposite end portions 22 and 24 which extend axially outward beyond respective bushing plates 12 and 14 for a substantial distance, preferably about 0.040 of an inch. Outer edges 26 are slightly rounded.

Figure 2:
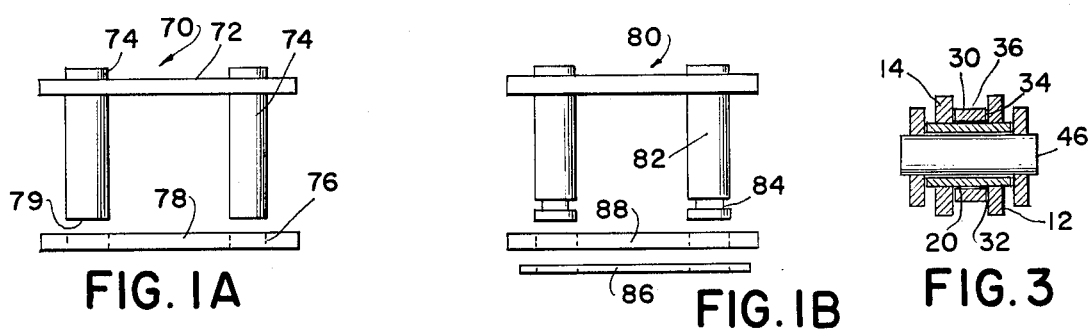
FIG. 2 is a side elevation of the chain shown in FIG. 1.

As shown in FIG. 2 bushing 20 may be formed of a rolled sheet which is welded 28 at abutting edges.

A roll 30 is loosely mounted on each bushing 20 between bushing plates 12 and 14.

Inner faces 32 of rolls 30 and radial faces 34 of rolls 30 are spaced sufficiently from outer faces of bushings 20 and inner faces of the bushing plates 12 and 14 to provide easy rotation of the rolls.

The pin links 4 are made up of first and second pin plates 42 and 44 which are connected to ends of pins by permanent connections such as by riveting or upsetting the ends. The pin plates 42 and 44 are assembled as close as possible to the ends 26 of bushings 20 without forming tight joints.

The pins may be connected to the pin plates in any suitable manner including welding. Upsetting the pin ends to tighten the pins in the pin receiving openings in the pin plates, and to close portions of the ends of the pins to overlie outer surfaces of the pin plates is the desired form of connection. The pins may be welded to the pin plates if desired.

The bushing plates and bushings may be assembled in any convenient manner such as by welding the bushings in the bushing receiving openings in the bushing plates. Preferably, the bushings are assembled by pressing the bushings into the bushing plates or pressing the bushing plates on the bushings with an interference fit.

One end 50 of chain 1 may be provided with two pin plates 52 and 54 which are connected by a single pin 56. An assembly rivet pin 60 with a spun head 62 slides through opening 64 and opening 66 so that the end 68 of the assembly pin may be upset after the pin 60 is inserted through hole 64 the free bushing 20 at the opposite end of the chain and hole 66 in the lower pin plate 52.

Figures 1A, 1B, 3:
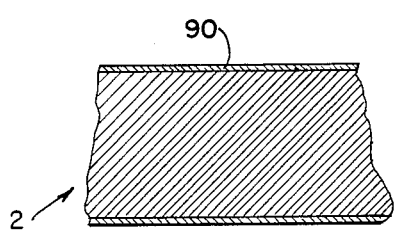
FIGS. 1a and 1b show preferred connective links which are used with the chain shown in FIG. 1.
FIG. 3 is a cross-sectional detail of the chain taken through line 3—3 of FIG. 1.

As shown in FIG. 1a a connection link 70 may be provided with an upper plate 72 and two pins 74 for sliding through open bushings at opposite ends of the chain and then through openings 76 in lower plate 78 before upsetting the free ends 79 of the pins to connect the chain in an endless loop.

An alternate connecting link 80 has pins 82 with grooves 84 that receive spring clip 86 after the pins are inserted through the appropriate end bushings and the openings in the lower link 88 and spring clip 86.

In a preferred embodiment of the invention, the pin plates, bushing plates and bushings are plated with a tin-nickel alloy to a thickness of about 0.0002-0.0004 inches. Pins and rolls are plated with a porous metal plating, preferably a porous nickel plating with a solid polymeric lubricant, preferably Teflon disposed in the pores. The rubbing of the plated pins against the inner surface of the alloy-plated bushings and the rubbing of the inner surface of the plated rolls against the outer surface of the plated bushings distributes a dry lubricating coating on the plated surfaces, fully lubricating the surfaces and releasing any dirt particles which come in contact with the surfaces. The plating on the rolls and the platings on the bushing plates also cooperate to lubricate the interface between the axially extending faces on the rolls and adjacent faces on the bushing plates.

The surface coatings further promote the surface smoothness and resist attachment of dirt or mud. The plating further resist surface deterioration due to roughness caused by moisture or chemicals.

The resultant chain is a dirt-resistant self-cleaning chain which avoids problems due to dirt build up in conventional chains used in bicycles, particularly dirt track racing bicycles made according to popular B.M.X. standards.

Figures 4, 5:
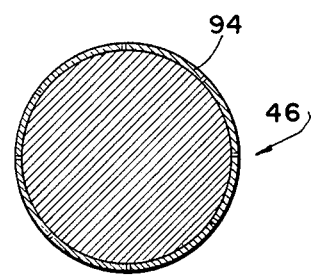
FIG. 4 is a cross sectional fractional view of a plated coating on a bushing plate which is similar to the plated coating on a pin plate.
FIG. 5 is a cross sectional view of the plated coating on a bushing of the present invention.

Referring to FIG. 4, bushing plate 2 is covered completely by a plated coating 90 which is a tin-nickel coating which is about 0.0002-0.0004 inches thick. A suitable tin-nickel plating is known as a Fountain plate coating alloy of FPC alloy.

As shown in FIG. 5, a similar plating 92 completely coats bushing 20.

Figures 6, 7:
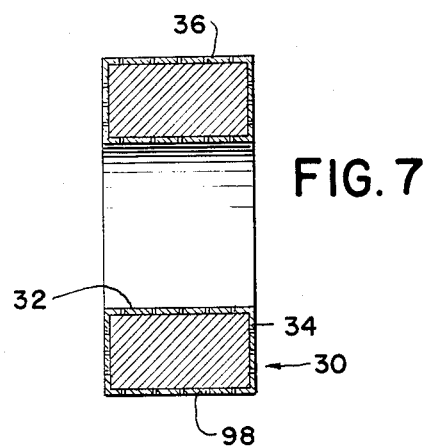
FIG. 6 is a cross sectional view of the plated porous coating on a pin of the present invention.
FIG. 7 is a cross sectional view of a roll showing the porous plated coating of the present invention.

FIG. 6 shows a cross sectional view of a pin 46 which is plated with a porous metal coating, preferably nickel, in which pores are filled with a solid polymeric lubricant, preferably polytetrafluoroethelene (PTFE, or Teflon). A suitable plating is known as Polyon plating.

FIG. 7 shows a roll 30 which is plated with similar lubricating porous metal and lubricating coating 98 over all its surfaces.

That which is claimed is:

1. Bicycle chain apparatus comprising plural bushing links, each bushing link having first and second parallel bushing plates, each bushing plate having first and second bushing receiving openings near opposite ends thereof, first and second bushings press fitted in interference fit in the openings in the first plate, first and second rollers loosely positioned respectively on the first and second bushings and the first and second bushings being press fitted through the first and second openings of the second bushing plate, opposite ends of the bushings extending substantially beyond the first and second bushing plates and forming thereby spacers, and plural pin links alternately connected to the plural bushing links, each pin link having first and second parallel pin plates, each pin plate having first and second pin receiving openings near opposite ends thereof, first and second pins inserted through first and second pin receiving openings in the first pin plate and respectively through a second bushing of a first bushing link and through a first bushing of a second bushing link and then respectively through first and second pin receiving openings in the second pin plate, opposite ends of the first and second pins being upset and expanded into respective first and second pin receiving openings in the pin plates, said pin plates maintained in spaced position from said bushing plates by said spacers on said bushings, the pins and the rollers having solid lubricating plated coatings on surfaces thereof for respectively providing lubrication to plated interior and exterior surfaces of the bushings, wherein the plated coatings on the rollers and pins comprise porous nickel platings having pores filled with solid polymeric lubricating material.

2. The apparatus of claim 1 wherein the bushings project approximately 40/1000 of an inch beyond respective bushing plates.

3. The apparatus of claim 2 wherein the respective bushings extend from about 0.105 to about 0.145 inches between adjacent parallel bushing plates.

4. The apparatus of claim 3 wherein the bushings extend from about 0.105 to about 0.115 inches between adjacent bushing plates.

5. The apparatus of claim 3 wherein the bushings extend from about 0.135 to about 0.145 inches between adjacent bushing plates.

6. The apparatus of claim 1 wherein the bushings extend beyond the bushing plates for a distance of from about ¼ to about 2/5 of the distance between the bushing plates.

7. Bicycle chain apparatus comprising plural bushing links, each bushing link having first and second parallel bushing plates, each bushing plate having first and second bushing receiving openings near opposite ends thereof, first and second bushings fixed respectively in the first and second openings of the first and second bushing plates, opposite ends of the bushings extending substantially beyond the first and second bushing plates and forming thereby spacers, and plural pin links alternately connected to the plural bushing links, each pin link having first and second parallel pin plates, each pin plate having first and second pin receiving openings near opposite ends thereof, first and second pins inserted through first and second pin receiving openings in the first pin plate and respectively through a second bushing of a first bushing link and through a second bushing link and then respectively through first and second pin receiving openings in the second pin plate, opposite ends of the first and second pins being fixed into respctive first and second pin receiving openings in the pin plates, said pin plates maintained in spaced position from said bushing plates by said spacers on said bushings, the pins having solid lubricating plated coatings on surfaces thereof for respectively providing lubrication to plated interior surfaces of the bushings, wherein the plated coating on the pins comprises porous plating having pores filled with polymeric lubricating material.

8. The apparatus of claim 7 wherein the coating comprises nickel plating.

9. The apparatus of claim 8 wherein pores in the plating hold polytetrafluoroethylene lubricant.

10. The apparatus of claim 7 further comprising plural rollers respectively positioned on the bushings and wherein the rollers have lubricating surface coatings between adjacent bushing plates.

11. The apparatus of claim 10 wherein roller coatings and pin coatings are identical.

12. The apparatus of claim 11 wherein the rollers and pin coatings comprise porous nickel platings with polytetrafluoroethylene lubricant in pores thereof.

13. The apparatus of claim 12 wherein the platings are approximately 0.0003 inches in thickness.

* * * * *